(12) United States Patent
Luo et al.

(10) Patent No.: US 8,296,030 B2
(45) Date of Patent: Oct. 23, 2012

(54) SYSTEM AND METHOD FOR CONTROLLING THE ENGINE OF A VEHICLE

(75) Inventors: Yun Luo, Ann Arbor, MI (US); Dieter Hoetzer, Plymouth, MI (US)

(73) Assignee: Robert Bosch GmbH, Stuttgart (DE)

( * ) Notice: Subject to any disclaimer, the term of this patent is extended or adjusted under 35 U.S.C. 154(b) by 188 days.

(21) Appl. No.: 12/832,050

(22) Filed: Jul. 7, 2010

(65) Prior Publication Data

US 2012/0010797 A1    Jan. 12, 2012

(51) Int. Cl.
*B60W 10/06* (2006.01)
(52) U.S. Cl. .......................................... 701/70; 701/112
(58) Field of Classification Search ................ 701/70, 701/112; 123/179.4
See application file for complete search history.

(56) References Cited

U.S. PATENT DOCUMENTS

| | | | |
|---|---|---|---|
| 5,451,820 A * | 9/1995 | Gotoh et al. ................. 307/10.6 |
| 6,629,515 B1 | 10/2003 | Yamamoto et al. | |
| 7,099,768 B2 | 8/2006 | Moriya | |
| 7,404,784 B2 * | 7/2008 | De Mersseman ............... 477/97 |
| 7,426,435 B2 * | 9/2008 | Gauthier et al. .............. 701/112 |
| 7,443,314 B2 | 10/2008 | Konishi et al. | |
| 7,853,401 B2 * | 12/2010 | Hoetzer ........................ 701/115 |
| 2003/0029406 A1* | 2/2003 | Weiss ......................... 123/179.4 |
| 2009/0192686 A1 | 7/2009 | Niehsen et al. | |
| 2009/0312933 A1 | 12/2009 | Hoetzer | |
| 2010/0191446 A1 * | 7/2010 | McDonald et al. ........... 701/113 |
| 2011/0071746 A1 * | 3/2011 | O'Connor Gibson et al. ............................. 701/101 |

FOREIGN PATENT DOCUMENTS

| | | |
|---|---|---|
| DE | 10234064 | 2/2004 |
| DE | 102008006028 A1 * | 7/2009 |

(Continued)

OTHER PUBLICATIONS

EPO machine translation of WO 2007/098999.*

(Continued)

*Primary Examiner* — James Trammell
*Assistant Examiner* — David Testardi
(74) *Attorney, Agent, or Firm* — Michael Best & Friedrich LLP

(57) ABSTRACT

A system for controlling an engine of a vehicle. In one embodiment, the system includes at least one monitoring device mounted on the vehicle, a controller in electronic communication with the at least one monitoring device, and a computer readable memory storing instructions executed by the controller. The instructions cause the controller to determine a current driving path of the vehicle based on data received from the at least one monitoring device, to detect a traffic congestion ahead of the vehicle in the current driving path based on data received from the at least one monitoring device, and to determine an alternative driving path of the vehicle based on data received from the at least one monitoring device. The instructions further cause the controller to calculate, using a first statistical model, a first probability that the traffic congestion will not move within a defined time period, and to stop the engine before the vehicle comes to a full stop when the first probability is greater than a first threshold.

12 Claims, 6 Drawing Sheets

FOREIGN PATENT DOCUMENTS

| | | | |
|---|---|---|---|
| DE | 102008031340 A1 | * | 1/2010 |
| JP | 10299531 | | 11/1998 |
| JP | 11002143 A | * | 1/1999 |
| JP | 2000073808 A | * | 3/2000 |
| JP | 2001283381 | | 10/2001 |
| JP | 2004108777 A | * | 4/2004 |
| JP | 2007056734 A | * | 3/2007 |
| JP | 2008115823 A | * | 5/2008 |
| JP | 2009156202 | | 7/2009 |
| JP | 2010138786 A | * | 6/2010 |
| WO | 03/001055 | | 1/2003 |
| WO | 2007/098999 | | 9/2007 |
| WO | 2009/092481 | | 7/2009 |

OTHER PUBLICATIONS

JPO Machine translation of JP 2008-115823.*
JPO machine translation of JP 2004-108777.*
JPO machine translation of JP 11-2143.*
PCT/US2011/043176 International Search Report and Written Opinion dated Oct. 14, 2011 (11 pages).

* cited by examiner

SYSTEM AND METHOD FOR CONTROLLING THE ENGINE OF A VEHICLE

FIELD

Embodiments of the invention relate to systems for improving the fuel economy and reducing the exhaust emission rate in vehicles. More specifically, embodiments of the invention relate to systems and methods for controlling the engine of a vehicle by automatically stopping the engine when the vehicle approaches traffic congestion.

BACKGROUND

Generally, fuel consumption due to idling of vehicle engine can be reduced by shutting off the engine when the vehicle is stopped waiting for a traffic light, when the vehicle is stopped due to traffic congestion, or both. Some existing systems stop and restart the engine based on the signal from a traffic light when the vehicle is stopped at the traffic light. Other systems are designed to turn the engine off and on based on the movement state of other vehicles in the same lane. However, the previously disclosed methods do not propose controlling the engine of a vehicle by using statistical models that evaluate visual data obtained from a camera mounted on the vehicle to predict when traffic congestion will occur or change.

SUMMARY

There is a need for an improved method for controlling the engine of a vehicle that helps reduce the idling time of an engine and improves the vehicle's fuel economy. The present invention provides, among other things, methods and systems for controlling the engine of a vehicle by executing two adaptable statistical models that evaluate information obtained from a camera and determine when to stop the engine before the vehicle comes to a complete stop in traffic congestion.

The invention provides a system for controlling an engine of a vehicle. The system includes at least one monitoring device mounted on the vehicle, a controller in electronic communication with the at least one monitoring device, and a computer readable memory storing instructions executed by the controller. The instructions cause the controller to determine a current driving path of the vehicle based on data received from the at least one monitoring device, to detect traffic congestion ahead of the vehicle in the current driving path based on data received from the at least one monitoring device, and to determine an alternative driving path of the vehicle based on data received from the at least one monitoring device. The instructions further cause the controller to calculate, using a first statistical model, a first probability that the traffic congestion will not move within a defined time period, and to stop the engine before the vehicle comes to a full stop when the first probability is greater than a first threshold.

The invention also provides a method of controlling an engine of a vehicle. The method includes operating at least one monitoring device mounted on the vehicle, determining a current driving path of the vehicle based on data received from the at least one monitoring device, detecting traffic congestion ahead of the vehicle in the current driving path based on data received from the at least one monitoring device, and determining an alternative driving path of the vehicle based on data received from the at least one monitoring device. The method further comprises calculating (using a first statistical model) a first probability that the traffic congestion will not move within a defined time period, and stopping the engine of the vehicle before the vehicle comes to a full stop when the first probability is greater than a first threshold.

The invention also provides a system for controlling an engine of a vehicle. The system includes a camera, a controller that electronically communicates with the camera to receive data, and a memory that stores instructions executed by the controller is provided. The instructions cause the controller to stop the vehicle engine when the vehicle is moving and the controller determines, based on a first statistical model evaluating data received from the camera, that a first probability that the traffic congestion will not move within a defined time period is greater than a first threshold. The instructions further cause the controller to start the vehicle engine when the vehicle is stopped and the controller determines, based on a second statistical model evaluating data received from the camera, a second probability that the traffic congestion will move within a second defined time period is greater than a second threshold.

In another implementation, the system includes similar components (a camera mounted on a vehicle, a controller in electronic communication with the camera, and a computer readable memory storing instructions executed by the controller). However, the instructions cause the controller to stop the engine of the vehicle based on data received from the camera, determine a current driving path of the vehicle based on data received from the camera, detect traffic congestion (or a congestion state) ahead of the vehicle in the current driving path based on data received from the camera, calculate a probability that the traffic congestion will begin moving within a defined time period (using a statistical model), and restart the engine of the vehicle, when the probability is greater than a threshold.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
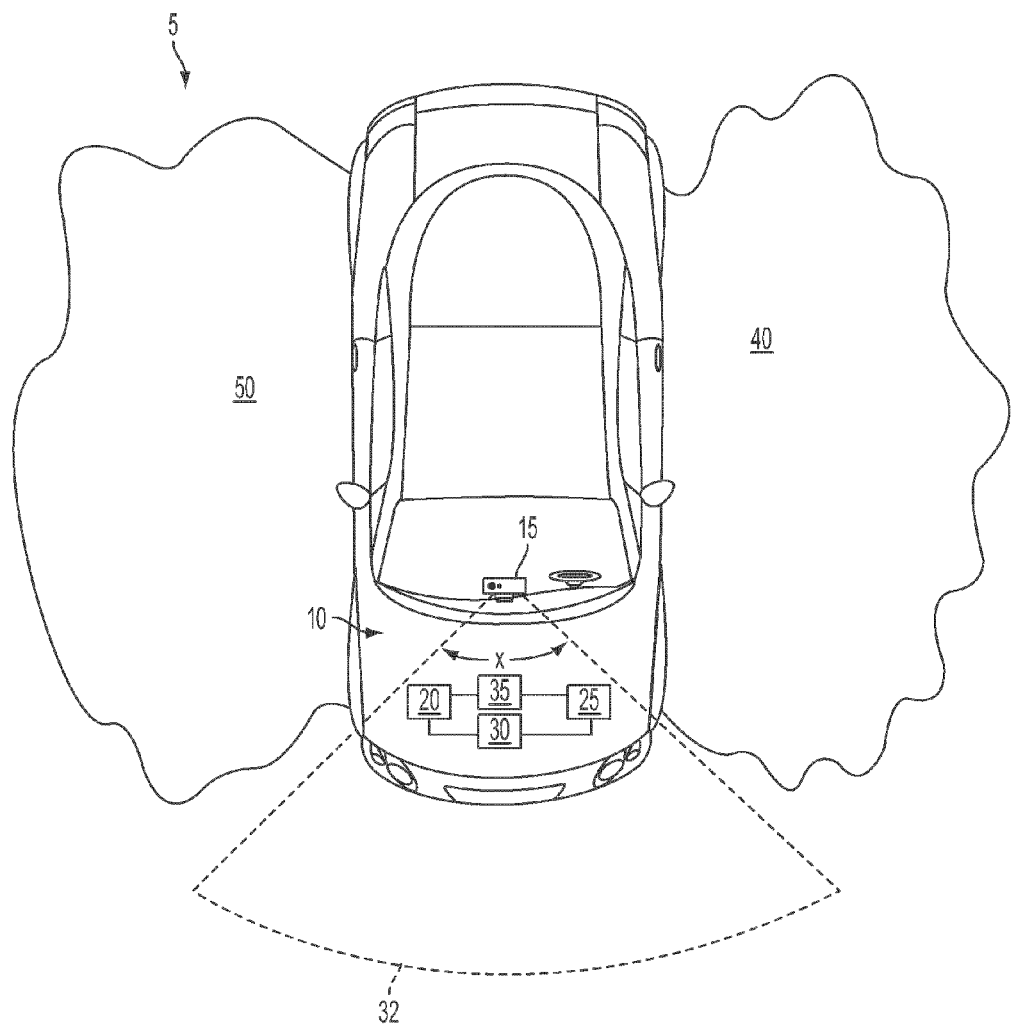
FIG. 1 illustrates a vehicle equipped with a system for controlling the vehicle's engine in accordance with the invention.

FIG. 1 illustrates a system 5 including a vehicle 10 having at least one monitoring device (i.e., a camera) 15 that is mounted on the vehicle 10. The system 5 also includes a controller 20. The controller 20 can take the form of a programmable microprocessor with appropriate I/O devices or chips, a microcontroller, or a similar device. As described in greater detail below, the controller executes computer executable programs (i.e., software) with the aid of an operating system (not illustrated). Alternatively, the controller includes hardware, such that functions described herein are performed by hardware components. For example, the controller 20 may be implemented by an application-specific, integrated circuit ("ASIC"), dedicated components, or the like.

In various embodiments, the controller 20 processes the data images obtained from the camera 15 and controls the operation of the camera 15 and the internal combustion engine 25 of the vehicle (FIG. 1). In alternative embodiment, the system 5 can also include one or more sensors 35 (such as radar sensors) that are used to sense and report the location of various objects around the vehicle 10. Although sensors and radar devices can be used to supplement the operation of the camera 15 and to provide more precise data, these devices are not necessary in all implementations of the system 5. Generally, the camera 15 is connected to a network, such as a controller area network ("CAN") bus 30, which is connected to the controller 20. The CAN bus 30 is connected to other vehicle systems.

The camera 15 is mounted behind the windshield of the vehicle 10. The camera 15 is positioned in the center of the windshield and is pointed forward. The field of view 32 of the camera covers a space in front of the vehicle that extends beyond the width of the vehicle 10. The camera 15 monitors the driving path of the vehicle, various objects in the surrounding environment, and continuously captures data images in the visible and/or near infrared spectrum. The camera 15 captures and reports conditions in the environment along with moving or static objects located in front or around the vehicle 10. The camera provides image data to a controller 20 that processes the images to detect stationary objects, such as pavement, a wall, a parked vehicle, or a utility pole, or moving objects, such as a pedestrian or a moving vehicle. In addition, the controller 20 can detect characteristics of the surrounding environment such as a traffic sign, pedestrian light, cross-lane traffic, traffic light signals, preceding vehicles brake light signals, and others.

The position of the camera 15 of the system 5 can vary depending on the different embodiments of the system and the type of camera used in those embodiments. The system 5 can also include more than one camera 15. For example, additional cameras can be mounted in each of the corners of the windshield and can provide a better view of the objects that are located on both sides of the vehicle 10. The camera 15 can be configured in a number of ways. For example, in one configuration the camera 15 includes a monocular camera module. In another configuration, the camera includes a binocular camera module. In addition, the camera can be designed or built based on one or more detection technologies such as a complimentary metal-oxide semiconductor ("CMOS") or charge-coupled device ("CCD") technologies. The camera can capture monochrome (black and white) or color images. In one particular embodiment, the camera 15 includes a 640×480 pixel CCD chip, although detectors with other pixel numbers and aspect ratios are also possible.

The camera 15 delivers a series of images to the controller 20. In various embodiments, the camera 15 delivers at least one, five, ten, twenty, thirty, or more images per second to the controller 20, although other rates are also possible. Using these images, the controller 20 calculates the distance between the vehicle 10 and various objects located in front and around the vehicle 10 by measuring the size of the objects and performing various calculations.

At least one of two different camera lenses is used with the camera 15: a standard lens or a wide angle lens (to enlarge the camera's field of view). When a wide-angle lens is used, the horizontal field of view of is enlarged (e.g., to angle of approximately $\alpha=180°$ as shown in FIG. 1). Depending on the lens used, the field of view in the vertical direction is enlarged or remains substantially the same as the field of view provided with a standard lens. Different types of lens may be used to provide desired horizontal and vertical fields of view so that the camera 15 captures objects that are located within a predetermined distance from the vehicle 10. When wide-angle and other specific lens are used, distortion caused by the lens is corrected (if desired) by distortion correction algorithms executed by the controller 20.

While cameras alone can be used to detect conditions that trigger engine shut off, other sensors are used in alternative implementations. One or more sensors 35 are attached to vehicle so that they sense activity and objects in areas or regions outside the perimeter of the vehicle. The objects sensed fall into two broad categories: stationary objects (such as pavement, walls, parked vehicles, or utility poles) and moving objects (such as pedestrians or moving vehicles). Sensors located on the sides (e.g., doors), front (e.g., front bumper), or rear (e.g., rear bumper) of the vehicle are useful in detecting such objects. The types of sensors that may be used include radar, ultrasonic, infrared light, and proximity (e.g., capacitive) sensors.

Time-of-flight measurements (e.g., using radar, light, or ultrasound) provide one way of determining distance to objects near the vehicle 10. In some embodiments, each individual sensor 35 determines the size and location of nearby objects. In other embodiments, combined information from an array of object sensors 35 determines the size and location of objects by triangulation.

In some embodiments, the sensors 35 collect information from horizontal sensing regions 40 and 50 (FIG. 1) located on the sides of the vehicle 10. The sensors map the sensed area and report the size and location of one or more objects located next to the vehicle 10 to the controller 20. The regions 40 and 50 begin at ground level and continue to a predetermined height above the ground (such as about two hundred and fifty centimeters). The sensing regions 40 and 50 extend along the side of the vehicle 10 (e.g., a distance of ten meters) and outwardly or laterally from the vehicle (e.g., by a distance of five meters). The size of the regions 40 and 50 can be varied by adjusting the sensors sensitivity, using particular types of sensors, changing the number of sensors, changing the locations of the sensors, or a combination of these adjustments. For example, the sensing regions can be located in the front and the rear of the vehicle.

Figure 2:
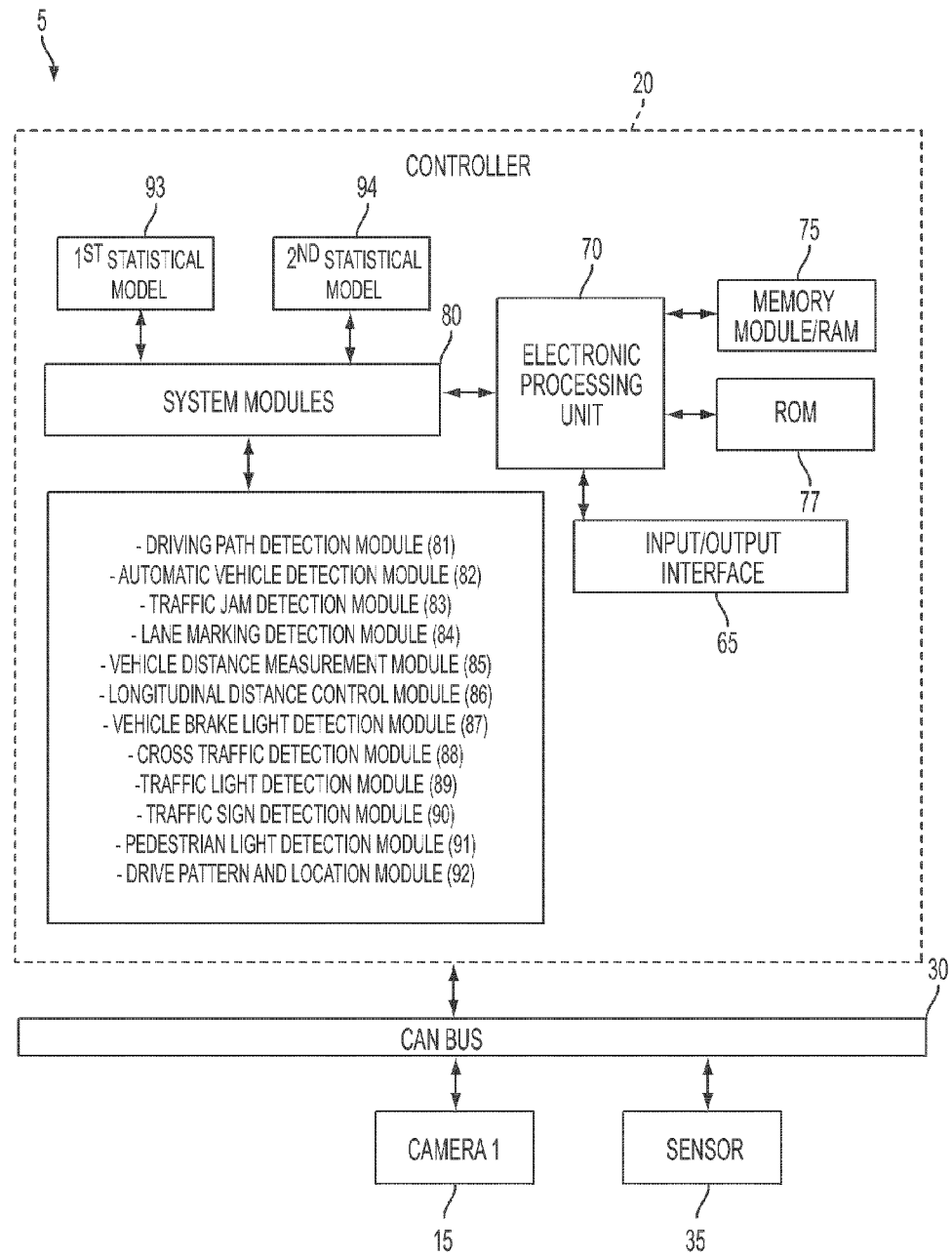
FIG. 2 is a schematic illustration of a system for controlling the engine of a vehicle.

FIG. 2 schematically illustrates components of the controller 20 and the connections between the controller and the camera 15 and the CAN bus 30. The controller 20 receives images (or image data) from the camera 15 and processes that data using various applications or modules in order to control the engine of the vehicle. In some embodiments, the controller 20 obtains data images directly from the camera 15 rather than over the bus 30. As discussed above, the controller 20 also receives data from at least one sensor 35 in embodiments that include such sensors.

In the example illustrated in FIG. 2, the controller 20 includes an input/output interface 65, an electronic processing unit ("EPU") 70, and one or more memory modules, such as a random access memory ("RAM") 75 and read-only memory ("ROM") 77. The controller 20 electronically communicates with the camera 15. The input/output interface 65 transmits and/or receives information over the bus 30, including images from the camera 15 and sensor readings from the sensors 35 (not shown). The controller 20 also includes a variety of system modules 80 that are stored as instructions in a memory (e.g., RAM 75 or ROM 77) and are executed by the EPU 70. These modules include a driving path detection module 81, an automatic vehicle detection module 82, a traffic jam detection module 83, a lane marking detection module 84, a vehicle distance measurement module 85, a longitudinal distance control module 86, a vehicle brake light detection module 87, a cross traffic detection module 88, a traffic light detection module 89, a traffic sign detection module 90, a pedestrian light detection module 91, and a drive pattern and location module 92.

As described in greater detail below, the modules 81-92 are executed by the EPU 70 and are architected to: 1) detect a traffic jam or congestion ahead of the vehicle, 2) determine whether brakes of the vehicle will need to be applied in order to bring the vehicle to a complete stop at the end of the traffic congestion, and 3) provide information to a first statistical model 93 and a second statistical model 94 that determine if the traffic congestion will move/not move within a defined time period. The first and second statistical models 93, 94 are stored to the memory of the controller (e.g., RAM 75 or ROM 77) and are used to determine a probability that traffic will or will not move within a predetermined period of time. The statistical models can be stored, for example, in the form of computer executable instructions, look-up tables, or other mechanisms for processing data received from the modules. Based on the data images processed by the various modules and the result from the statistical models 93 and 94, the system 5 determines when to stop the engine of the vehicle 10 before the vehicle comes to a complete stop at a traffic jam and when to restart the engine of the vehicle sitting in a traffic jam.

The EPU 70 receives data (such as image data and sensor readings) from the input/output interface 65 and processes the information by executing one or more applications or modules 80. The applications or modules 80 (or other instructions that are executed by the controller 20) are stored in memory, such as ROM 77. The EPU 70 stores information (e.g., information received from the bus 30 or information generated by applications or modules 80 executed by the EPU 70) to the RAM 75. Further, the RAM 75 can receive and store data from all other components of the system 5. While RAM 75 is used in the embodiment shown in FIG. 2, other memory devices can be also implemented.

Figure 3:
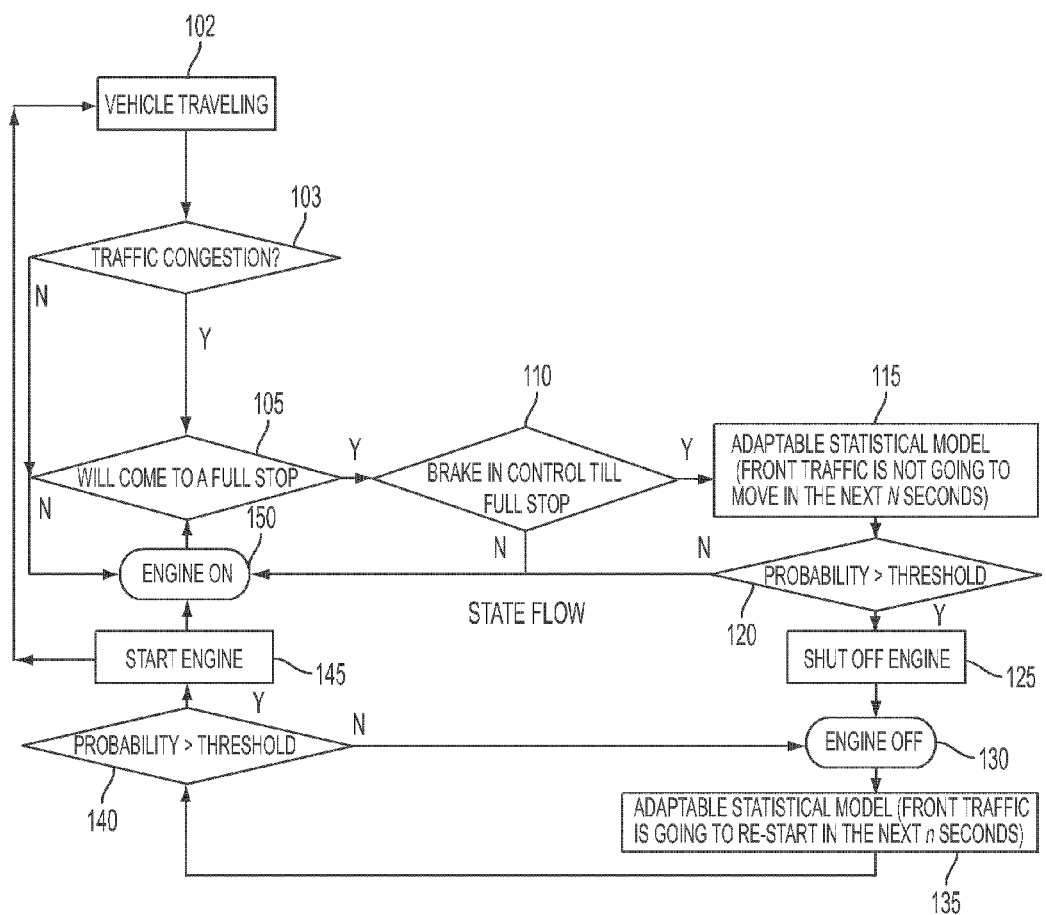
FIG. 3 is a flowchart illustrating the general operation of a system for controlling the engine of a vehicle.

The operation or state flow of the system 5 is illustrated in FIG. 3. The system 5 is configured to stop the engine of a moving vehicle 10 when it is determined, based on the first statistical model, that the vehicle will come to a complete stop due to traffic congestion. After the vehicle comes to a complete stop and the engine is stopped, the system 5 is configured to restart the engine when it is determined, based on the second statistical model, that the traffic congestion lessens (i.e., traffic begins to move or flow).

Initially, the vehicle 10 is traveling on a road (step 102) and the system 5 continuously determines whether there is traffic congestion on the road (step 103). When traffic congestion is detected, the system 5 then determines whether the vehicle will come to a full stop because of existing traffic congestion (step 105). If so, the system determines whether the brakes of the vehicle will need to be applied constantly in order to bring the vehicle to a complete stop (step 110). In performing steps 105 and 110, the system 5 executes modules 81-86. If there is traffic congestion and the brakes will be applied, the system uses the first statistical model 93 to determine a probability that the detected traffic will not move within a first defined time period (step 115). The first statistical model 93 uses information and output provided from modules 87-92. If the probability is greater than a first threshold (step 120), the system 5 stops the engine before the vehicle reaches the traffic congestion and comes to a complete stop (step 125).

While the engine is off (step 130) and the vehicle is not moving, the system 5 continuously uses the second statistical model 94 to determine a probability that the traffic will move within a second defined time period (step 135). The second statistical model 94 also uses information provided from modules 87-92. If the probability that the traffic congestion will move within a second defined time period is larger than a second threshold (step 140), the system 5 restarts the engine (step 145). The vehicle begins traveling (step 102) and the system 5 again continuously monitors for traffic congestion (step 103).

As described above, one of the functions of the system 5 is to determine whether the vehicle will come to a full stop because of detected traffic conditions (step 105). To accomplish this, the controller 20 executes the driving path detection module 81 to determine the current driving path of the vehicle 10. The driving path of the vehicle is usually defined by using image processing techniques to evaluate the position of a plurality of obstacles on the road. These obstacles include concrete or asphalt curbs, concrete barriers, walls, and similar objects that dictate or restrict the driving path or the vehicle 10. As a consequence, the location of these objects is useful for determining a drive path and the locations are accounted for in the driving detection module 81. Further, the controller 20 uses the automatic vehicle detection module 82 to identify vehicles that are in the field of view of the camera 15 and may be located in the lane of the vehicle 10 or neighboring lanes (lanes are detected by the lane marking detection module 84, which is described below).

The automatic vehicle detection module 82 calculates the longitudinal distance from the detected preceding vehicles and the host vehicle 10. This calculation is performed based on images received from the camera 15 and can be accomplished using geometric calculations. For example, most cars include a standard license plate of a known width but the height of the license plate can vary and is not always known. The system 5 first detects the lower edge of the vehicle, which is on ground plane. The system 5 then uses the camera mounting height, that is known, and θ, that is a pitching angle compared to the horizon, in order to calculate the distance from the host vehicle 10 to the preceding vehicle.

Figure 4:
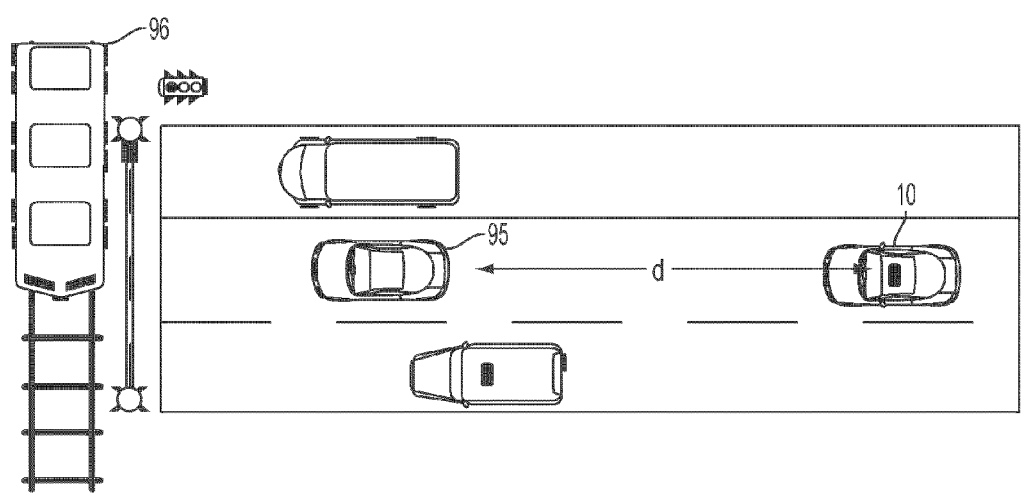
FIG. 4 is a diagram that represents an example of traffic congestion where the system for controlling the engine of a vehicle can be used.

The controller 20 uses the traffic jam detection module 83 to detect traffic congestion and to determine whether the vehicle 10 will come to a full stop at the traffic congestion. The traffic jam detection module 83 uses information about the longitudinal distance between the vehicle and a preceding vehicle and the movement of the preceding vehicle within the current driving path of the vehicle 10 in order to determine that a traffic jam exists. After detecting traffic congestion, the system also determines whether an alternative driving path exists that would help to avoid long idling of the vehicle. The system 5 then determines the earliest time that the engine can be shut off based on the dynamics of the vehicle 10 and the detected longitudinal distance "d" between the vehicle 10 and a preceding vehicle 95 in the same lane or driving corridor (FIG. 4).

Next, as described above with respect to step 110 in FIG. 3, the system 5 determines whether the brakes of the vehicle will be applied throughout the entire deceleration of the vehicle in order to bring the vehicle to a stop behind the traffic congestion. The controller 20 first executes the lane marking detection module 84 that processes the data images from the camera 15 and identifies various types of lane markings in front of the vehicle 10. Depending on the position of the vehicle 10, current driving lane and neighboring lanes are recognized. The controller 20 further executes the vehicle distance measurement module 85 that uses various visual clues and geometrical calculations to determine the distance from the host vehicle to the preceding vehicles. Then, the controller 20 uses the longitudinal distance control module 86 to determine whether the brakes of the vehicle will be applied throughout the entire deceleration of the vehicle until it reaches the traffic congestion and comes to a complete stop. The longitudinal distance control module 86 uses the distance to the preceding vehicle in the same driving lane and the current vehicle dynamics (speed, acceleration, etc.) to calculate whether the brakes of the vehicle should be applied. When driving lanes are not available, the longitudinal distance control module 86 uses a driving corridor instead of driving lane.

After the system 5 determines that constant braking will be required to bring the vehicle to a full stop behind detected traffic congestion, the system 5 uses a first statistical model 93 to determine the probability that traffic will not move within a first defined time period (step 115). The system modules 87-92 are used by the system 5 to directly provide information from various surrounding sources to the first statistical model 93 and the second statistical model 94. In addition, the data received from the modules 87-92 can be stored on the RAM 75 and can be accessed and used at a later time by the statistical models 93 and 94. Based on the data provided from the modules 87-92 and the information retrieved from the RAM 75, the statistical models 93 and 94 perform statistical calculations and determine the probability that the preceding traffic congestion will move/not move within defined time periods.

The vehicle brake light detection module 87 detects the status of the brake light of the preceding vehicle. As shown in FIG. 4, after the camera 15 has provided the controller 20 with an image of the preceding vehicle 95, the brake light of that vehicle can be located by the vehicle brake light detection module 87. The module 87 can then determine whether the brakes lights of the vehicle 95 are on or off.

The cross traffic detection module 88 detects cross traffic ahead of the vehicle 10 and indicates when the driving path of the vehicle 10 is clear. For example, as illustrated in FIG. 4, the cross traffic detection module 88 will detect the train 96 that is crossing the path of the vehicle 10 and will indicate that the vehicle's crossing path is not clear. When the train moves away from the road, the cross traffic detection module 88 detects that the cross traffic of the vehicle is clear and outputs that information to the statistical models 93 and 94.

The traffic light detection module 89 uses image data from the camera 15 to detect and indicate the current driving signals of a traffic light: red, yellow, or green. In certain embodiments, the module 89 also identifies a display located on the traffic light that counts down the duration of time until the light changes to the next color. In addition, the corresponding traffic light signal for a left or right turn can also be recognized by the traffic light detection module 89.

The traffic sign detection module 90 recognizes traffic signs that are located on the current driving path of the vehicle 10. Such traffic signs may include, for example, "Stop" signs, "Yield" signs, "Do not enter" signs, and others. These traffic signs generally hold information used by the controller to determine the moving pattern of the traffic congestion.

The pedestrian light detection module 91 recognizes and evaluates the status of a pedestrian light signal. The pedestrian light may include a light indicator signal (red, white, etc.), a display that indicates the status of the pedestrian light signal (walk, don't walk), and a display that counts down the duration of time until the light changes to the next color. The pedestrian light detection module 91 identifies all of these visual indicators and uses them as cues to determine the time when the traffic is about to change.

The drive pattern and location module 92 keeps a history of the traffic pattern in which the vehicle operates. For example, if a driver generally drives the vehicle in a city traffic, the module 92 records the length of the traffic lights and can help the system 5 to "self learn" or adapt to a specific traffic pattern (city traffic with many lights or highway traffic without lights). This evaluation of the traffic pattern and the corresponding timing information regarding the length of traffic signals becomes important when the system 5 evaluates the exact moment to stop or restart the engine when the vehicle is in traffic. Untimely stopping or restarting the engine, before reaching traffic or before the traffic is ready to move, increases fuel consumption. Therefore, the drive pattern and location module 92 assists with providing more precise information to the system before the system makes the decision to stop/restart the engine.

In addition, the system 5 can also include a global positioning system ("GPS") that is connected to or communicates with the drive pattern and location module 92. The GPS determines the specific location of the vehicle at any particular moment. The GPS transmits information about the location of the vehicle to the module 92. Further, the drive pattern and location module 92 can determine specific information indicators of a particular location. For example, the module 92 determines the length of a traffic light signal or a pedestrian light signal at a specific intersection. That information can be stored in the RAM 75 of the controller 20. When the GPS informs the system 5 that the vehicle 10 is at the same location again, the drive pattern and location module 92 can access the data that is stored in the memory and analyze it together with the currently received image data to perform faster and more precise determination of the traffic congestion.

The statistical models 93 and 94, described above, are sophisticated models that perform various calculations and have adaptable, "self learning" capabilities. Both statistical models receive data inputs from modules 87-92 that provide information from multiple sources in the surrounding environment. In addition, the statistical models 93 and 94 can retrieve data previously outputted by modules 87-92 and stored in the RAM 75. The models 93 and 94 "learn" over a period of time and adapt to a particular driving route. For example, the length of a turn signal light varies between cities and rural areas. If the vehicle travels regularly on the same route (i.e., 5 times a week when the driver is going to work) the statistical models 93 and 94 learn to recognize the length specific signals on that route and process the data from these signals more efficiently. Similar to the operation of the module 92, the statistical models 93 and 94 adapt to specific traffic patterns. Therefore, by combining the currently received data images with the data that was previously stored in the system memory, the system 5 operates more efficiently and the statistical models 93 and 94 have greater success in predicting whether the traffic congestion will move/not move.

The first statistical model 93 calculates a first probability that the traffic congestion will not move within a first defined time period. That defined time period could be 3 seconds, 5 seconds, or another period determined by the system. The defined time period can be set by the driver or can be automatically adjusted by the system based on the data received from the various modules that is used to determine the movement of the traffic. Using statistical calculations, the first statistical model 93 processes the input data from modules 87-92 and the data retrieved from the RAM 75. If the first statistical model 93 determines that the first probability that the traffic congestion will not move within the first defined time period is greater than a first threshold, the system 5 will stop the engine of the vehicle before the vehicle comes to a full stop behind the traffic congestion.

The second statistical model 94 operates when the engine of the vehicle is shut off and the vehicle is waiting in traffic congestion. Generally, it takes some time to restart the engine of the vehicle. Using calculations similar to model 93, the second statistical model 94 processes the information received from modules 87-92 and the data retrieved from the RAM 75. The model 94 determines a second probability that the traffic congestion will move within the second defined time period. If the second statistical model 94 determines that the second probability (that the traffic congestion will move within the second defined time period) is greater than a second threshold, the system 5 restarts the engine just before the driver is ready to push the gas pedal. The earlier detection that the traffic will move improves the system 5 response to the driver of the vehicle. The engine needs to be restarted before the driver is ready to push the gas pedal to avoid inconvenience to the driver. The process of restarting the engine right before the traffic moves is performed without action or input of the driver. Nonetheless, the driver has the capability to overtake control of the system by pushing the gas pedal to start the engine or by manually turning on the engine.

Figure 5:
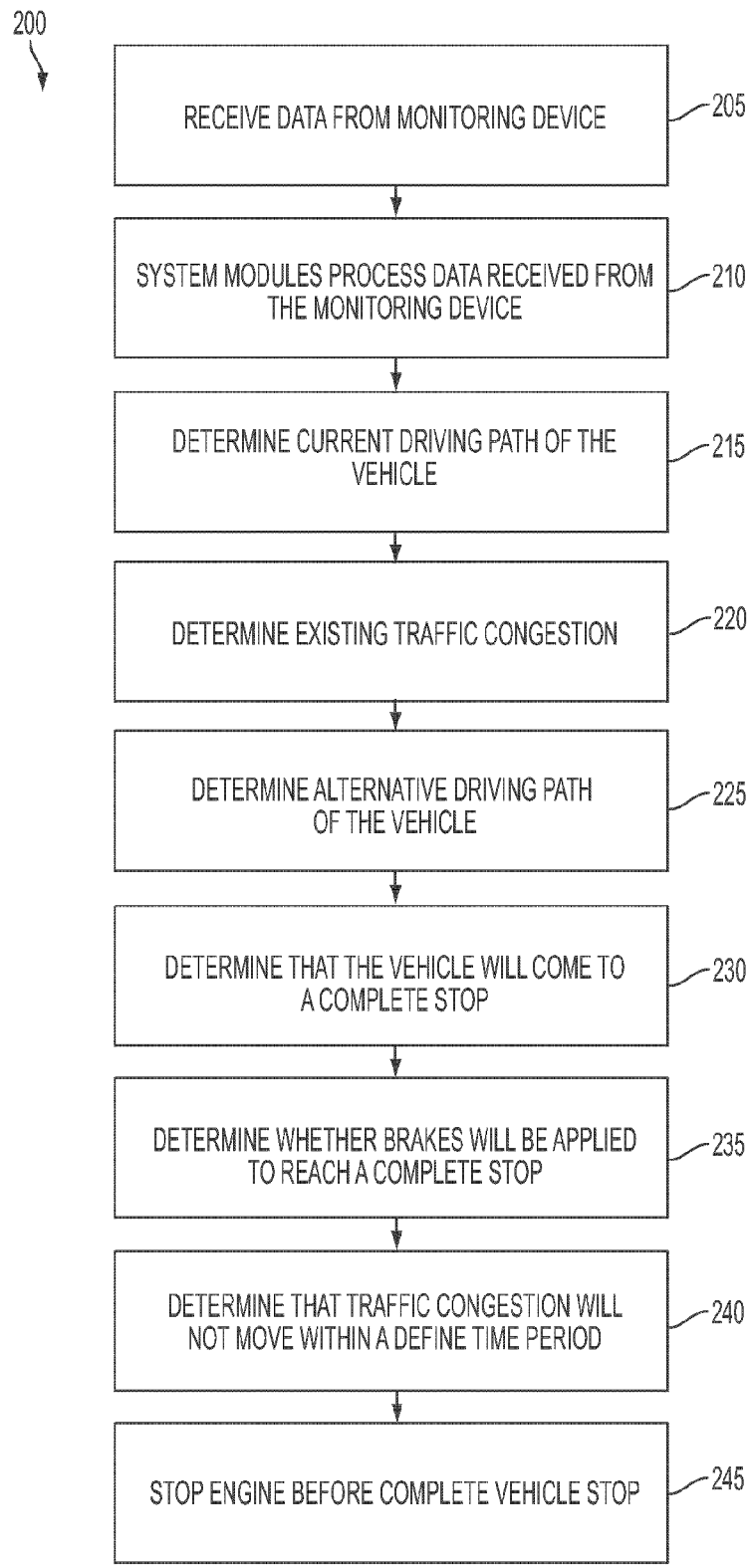
FIG. 5 is a block diagram that shows an engine shut-down process performed by the system for controlling the engine of a vehicle.

FIG. 5 illustrates a method 200 that shows the operation of the system 5 shutting off the engine of the vehicle before the vehicle comes to a full stop in traffic congestion. In some embodiments, the method 200 is carried out by the controller 20 shown in FIG. 2. The controller 20 of the system 5 receives images from the camera 15 (step 205) and the controller 20 processes the image data received from the camera 15 using modules 81-92 (step 210). The driving path detection module 81 and the automatic vehicle detection module 82 then determine the current driving path of the vehicle 10 (step 215). The traffic jam detection module 83 determines that traffic congestion exists (step 220) and the system 5 evaluates the road conditions and determines whether an alternative driving past exists so the vehicle 10 can avoid long idling (step 225). When there is traffic congestion and no alternative driving path exists, the traffic jam detection module 83 determines that the vehicle 10 will come to a full stop at the end of the traffic congestion (step 230). The traffic jam detection module 83 evaluates the longitudinal distance between the vehicle and the preceding vehicles, and movement of the preceding vehicle within the current driving path of the vehicle to determine whether the vehicle 10 will come to a full stop.

After it is determined that the vehicle will come to a full stop, the longitudinal distance control module 86 uses the information from the lane marking detection module 84 and the vehicle distance measurement module 85 and determines whether brakes of the vehicle 10 should be applied throughout a deceleration until the vehicle reaches a complete stop behind the traffic congestion (step 235). If the system 5 determines that the vehicle 10 will come to a complete stop and the brakes will be applied, the first statistical model 93 determines a first probability that the traffic congestion will not move within the first defined time period and the probability is compared to a first threshold (step 240). When the probability is greater than the threshold, the system 5 stops the engine of the vehicle 10 before the vehicle comes to a full stop behind the traffic congestion (step 245). That way, the system 5 reduces the idling time of the engine and improves the vehicle's fuel economy and exhaust emission rate.

Figure 6:
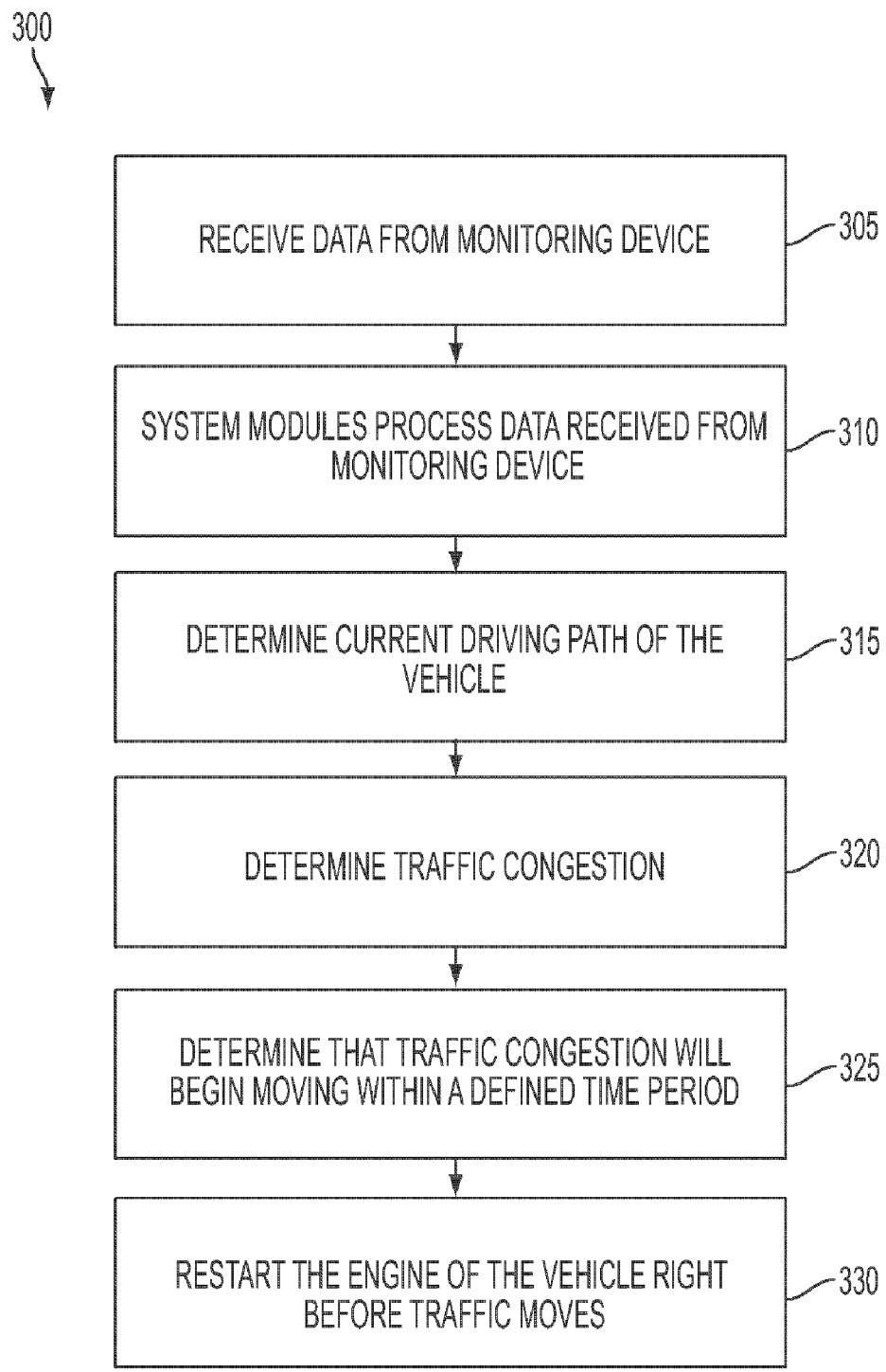
FIG. 6 is a block diagram that shows an engine start-up process performed by the system for controlling the engine of a vehicle.

FIG. 6 illustrates a method 300 that shows the operation of the system 5 restarting the engine of the vehicle when the vehicle is sitting in traffic. The method 300 is carried out by the controller 20. First, the controller 20 of the system 5 receives image data from the camera 15 (step 305). The controller 20 then processes the image data using modules 81-92 (step 310). The driving path detection module 81 and the automatic vehicle detection module 82 then determine the current driving path of the vehicle 10 (step 315). The traffic jam detection module 83 evaluates the surrounding conditions and determines that traffic congestion still exists (step 320). In the next step, the statistical model 94 determines whether the second probability that the traffic congestion will move within a second defined time period is larger than a second threshold (step 325). When the second probability is larger than the second threshold, the system 5 restarts the engine so that the vehicle is ready to operate when the traffic congestion moves and the driver depresses the accelerator pedal.

Various features and advantages of the invention are set forth in the following claims.

What is claimed is:

1. A system for controlling an engine of a vehicle, the system comprising:
   at least one monitoring device mounted on the vehicle that monitors an environment surrounding at least a portion of the vehicle;
   a controller in electronic communication with the at least one monitoring device; and
   a computer readable memory storing instructions that, when executed by the controller, cause the controller to:
   determine a current driving path of the vehicle based on data received from the at least one monitoring device,
   detect traffic congestion ahead of the vehicle in the current driving path based on data received from the at least one monitoring device,
   determine whether an alternative driving path of the vehicle exists based on data received from the at least one monitoring device,
   determine, when there is traffic congestion and no alternative driving path exists, that the vehicle will come to a complete stop behind the traffic congestion,
   determine whether brakes of the vehicle should be applied throughout a deceleration until the vehicle reaches the complete stop behind the traffic congestion,
   determine a moving pattern of the traffic congestion based at least in part on information regarding traffic signals and traffic signs,
   calculate, using a first statistical model, a first probability that the traffic congestion will not move within a defined time period, and
   stop the engine before the vehicle comes to the complete stop when the first probability is greater than a first threshold and when no alternative driving path exists.

2. The system of claim 1, wherein the computer readable memory further stores instructions for a driving path detection module that, when executed by the controller, determines a driving path of the vehicle by evaluating positions of a plurality of obstacles and an automatic vehicle detection module that, when executed by the controller, recognizes a preceding vehicle and calculates a longitudinal distance between the vehicle and the preceding vehicle, where the automatic vehicle detection module and the driving path detection module determine the current driving path.

3. The system of claim 2, wherein the computer readable memory further stores instructions for a traffic jam detection module that, when executed by the controller, determines traffic congestion and whether the vehicle will come to a full stop because of the traffic congestion based on the longitudinal distance between the vehicle and a preceding vehicle and movement of the preceding vehicle within the current driving path.

4. The system of claim 1, wherein the computer readable memory further stores instructions for a lane marking detection module that recognizes a driving lane and neighboring lanes, a vehicle distance measurement module that calculates a distance between the vehicle and a preceding vehicle located at an end of traffic congestion, and a longitudinal distance control module that uses information from the lane marking detection module and the vehicle distance measurement module and determines whether brakes of the vehicle should be applied throughout a deceleration until the vehicle reaches a complete stop behind the traffic congestion.

5. The system of claim 1, wherein the computer readable memory further stores instructions that, when executed by the controller, stop the engine when a traffic jam detection module determines that the vehicle will come to a complete stop because of traffic congestion, when a longitudinal distance control module determines that brakes should be applied throughout a deceleration of the vehicle, and when the first probability that the traffic congestion will not move within a defined time period is greater than the first threshold.

6. The system of claim 1, wherein the computer readable memory further stores instructions that, when executed by the controller, restart the engine when the vehicle is stopped and a second statistical model determines that a second probability that the traffic congestion will move within a second defined time period is greater than a second threshold.

7. The system of claim 1, wherein the computer readable memory further stores instructions for a cross traffic detection module that monitors cross traffic and indicates whether the driving path of the vehicle is clear, and wherein the first statistical model determines the first probability based at least in part on an output from the cross traffic detection module.

8. The system of claim 1, wherein the computer readable memory further stores instructions for a Traffic Sign Detection Module that automatically recognizes at least one traffic sign, and wherein the first statistical model determines the first probability based at least in part on an output from the Traffic Sign Detection Module.

9. The system of claim 1, wherein the computer readable memory further stores instructions for a pedestrian light detection module that recognizes changes in a pedestrian light signal, and wherein the first statistical model determines the first probability based at least in part on an output from the pedestrian light detection module.

10. The system of claim 1, wherein the computer readable memory further stores instructions for a drive pattern and location module that records history of a traffic pattern and a specific location of the vehicle in a memory of the controller, and wherein the first statistical model determines the first probability based at least in part on an output from the drive pattern and location module.

11. The system of claim 1, wherein the at least one monitoring device includes a camera.

12. The system of claim 11, wherein the camera includes at least one of a monocular camera module and a binocular camera module.

* * * * *